(12) United States Patent
Liu et al.

(10) Patent No.: US 8,614,951 B2
(45) Date of Patent: *Dec. 24, 2013

(54) GUARANTEED BANDWIDTH SHARING IN A TRAFFIC SHAPING SYSTEM

(75) Inventors: Changming Liu, Cupertino, CA (US); Yan Ke, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 189 days.

This patent is subject to a terminal disclaimer.

(21) Appl. No.: 13/222,568

(22) Filed: Aug. 31, 2011

(65) Prior Publication Data

US 2011/0310742 A1    Dec. 22, 2011

Related U.S. Application Data

(63) Continuation of application No. 09/658,424, filed on Sep. 8, 2000, now Pat. No. 8,032,653.

(51) Int. Cl.
*G08C 15/00* (2006.01)
(52) U.S. Cl.
USPC ........ 370/235.1; 709/226; 709/232; 709/233; 709/234; 709/235; 370/230.1
(58) Field of Classification Search
None
See application file for complete search history.

(56) References Cited

U.S. PATENT DOCUMENTS

| | | | | |
|---|---|---|---|---|
| 5,226,039 A | * | 7/1993 | Frank et al. | 370/405 |
| 5,274,641 A | * | 12/1993 | Shobatake et al. | 370/392 |
| 5,274,644 A | * | 12/1993 | Berger et al. | 370/230 |
| 5,289,462 A | | 2/1994 | Ahmadi et al. | |
| 5,367,637 A | * | 11/1994 | Wei | 710/56 |
| 5,381,407 A | * | 1/1995 | Chao | 370/233 |
| 5,408,465 A | * | 4/1995 | Gusella et al. | 370/231 |
| 5,412,647 A | * | 5/1995 | Giroux et al. | 370/232 |
| 5,448,567 A | * | 9/1995 | Dighe et al. | 370/233 |
| 5,535,436 A | * | 7/1996 | Yoshida et al. | 455/551 |
| 5,596,576 A | * | 1/1997 | Milito | 370/450 |
| 5,629,937 A | * | 5/1997 | Hayter et al. | 370/233 |
| 5,674,003 A | | 10/1997 | Andersen et al. | |
| 5,745,490 A | * | 4/1998 | Ghufran et al. | 370/397 |
| 5,790,521 A | * | 8/1998 | Lee et al. | 370/230 |

(Continued)

FOREIGN PATENT DOCUMENTS

WO    98/24208    6/1998

OTHER PUBLICATIONS

Co-pending U.S. Appl. No. 09/658,424, filed Sep. 8, 2000 entitled "Guaranteed Bandwidth Sharing in a Traffic Shaping System", by Liu et al, 18 pages.

*Primary Examiner* — Ian N Moore
*Assistant Examiner* — Dung B Huynh
(74) *Attorney, Agent, or Firm* — Harrity & Harrity, LLP (57) ABSTRACT

In one aspect the invention provides a method for allocating bandwidth in a network appliance where the network appliance includes a plurality of guaranteed bandwidth buckets used to evaluate when to pass traffic through the network appliance. The method includes providing a shared bandwidth bucket associated with a plurality of the guaranteed bandwidth buckets, allocating bandwidth to the shared bandwidth bucket based on the underutilization of bandwidth in the plurality of guaranteed bandwidth buckets and sharing excess bandwidth developed from the underutilization of the guaranteed bandwidth allocated to the individual guaranteed bandwidth buckets. The step of sharing includes borrowing bandwidth from the shared bandwidth bucket by a respective guaranteed bandwidth bucket to allow traffic to pass immediately through the network appliance.

20 Claims, 3 Drawing Sheets

(56) References Cited

U.S. PATENT DOCUMENTS

| | | | |
|---|---|---|---|
| 5,790,534 A | 8/1998 | Kokko et al. | |
| 5,796,719 A | 8/1998 | Peris et al. | |
| 5,796,956 A | 8/1998 | Jones | |
| 5,812,526 A * | 9/1998 | Chang et al. | 370/230 |
| 5,818,815 A * | 10/1998 | Carpentier et al. | 370/230.1 |
| 5,864,540 A | 1/1999 | Bonomi et al. | |
| 5,946,297 A * | 8/1999 | Calvignac et al. | 370/230 |
| 5,978,356 A * | 11/1999 | Elwalid et al. | 370/230 |
| 6,011,775 A | 1/2000 | Bonomi et al. | |
| 6,028,841 A | 2/2000 | Lyon et al. | |
| 6,044,060 A | 3/2000 | Jones | |
| 6,052,379 A * | 4/2000 | Iverson et al. | 370/442 |
| 6,088,360 A | 7/2000 | Amaral et al. | |
| 6,118,791 A * | 9/2000 | Fichou et al. | 370/468 |
| 6,147,970 A * | 11/2000 | Troxel | 370/235 |
| 6,167,050 A | 12/2000 | Chung | |
| 6,185,210 B1 | 2/2001 | Troxel | |
| 6,185,221 B1 * | 2/2001 | Aybay | 370/412 |
| 6,192,032 B1 | 2/2001 | Izquierdo | |
| 6,208,622 B1 | 3/2001 | Makrucki | |
| 6,247,061 B1 | 6/2001 | Douceur et al. | |
| 6,252,851 B1 * | 6/2001 | Siu et al. | 370/236 |
| 6,304,551 B1 * | 10/2001 | Ramamurthy et al. | 370/232 |
| 6,310,886 B1 | 10/2001 | Barton | |
| 6,347,077 B1 | 2/2002 | Ginzboorg | |
| 6,349,088 B1 | 2/2002 | Ginzboorg et al. | |
| 6,370,116 B1 | 4/2002 | Giroux et al. | |
| 6,388,992 B2 * | 5/2002 | Aubert et al. | 370/232 |
| 6,408,005 B1 * | 6/2002 | Fan et al. | 370/412 |
| 6,424,624 B1 | 7/2002 | Galand et al. | |
| 6,452,933 B1 | 9/2002 | Duffield et al. | |
| 6,483,839 B1 | 11/2002 | Gemar et al. | |
| 6,522,628 B1 * | 2/2003 | Patel et al. | 370/230.1 |
| 6,532,234 B1 * | 3/2003 | Yoshikawa et al. | 370/395.4 |
| 6,560,195 B1 | 5/2003 | Basak et al. | |
| 6,563,829 B1 | 5/2003 | Lyles et al. | |
| 6,578,082 B1 * | 6/2003 | Ho et al. | 709/233 |
| 6,601,084 B1 * | 7/2003 | Bhaskaran et al. | 718/105 |
| 6,611,522 B1 | 8/2003 | Zheng et al. | |
| 6,687,247 B1 | 2/2004 | Wilford et al. | |
| 6,690,647 B1 * | 2/2004 | Tang et al. | 370/235 |
| 6,801,500 B1 | 10/2004 | Chandran | |
| 6,829,649 B1 | 12/2004 | Shorey et al. | |
| 6,839,321 B1 | 1/2005 | Chiruvolu | |
| 6,862,270 B1 * | 3/2005 | Ho | 370/328 |
| 6,865,388 B2 | 3/2005 | Walsh et al. | |
| 6,868,063 B1 | 3/2005 | De Cnodder | |
| 6,876,626 B1 | 4/2005 | Onoe et al. | |
| 6,937,561 B2 | 8/2005 | Chiussi et al. | |
| 7,215,637 B1 * | 5/2007 | Ferguson et al. | 370/230.1 |
| 7,489,636 B1 * | 2/2009 | Cheung | 370/235.1 |
| 2002/0089929 A1 * | 7/2002 | Tallegas et al. | 370/230 |
| 2006/0132326 A1 * | 6/2006 | Fang et al. | 340/825.69 |

* cited by examiner

GUARANTEED BANDWIDTH SHARING IN A TRAFFIC SHAPING SYSTEM

RELATED APPLICATION

This application is a Continuation of U.S. application Ser. No. 09/658,424, filed Sep. 8, 2000, the entire disclosure of which is incorporated herein by reference.

TECHNICAL FIELD

The present invention relates generally to electrical computing systems, and more particularly to tools for shaping network traffic in a communication system.

BACKGROUND

There are many emerging trends in the communications world, including the increase in network technology and the proliferation of data networks. To ensure security of communications and to avoid networking congestion problems, network designers have either incorporated security appliances, such as firewalls and virtual private networks, and traffic management devices in their systems or enhanced their routers with these functionalities.

A firewall is an Internet security appliance designed to screen traffic coming into and out of a network location. A virtual private network provides a secure connection through a public network such as the Internet, between two or more distant network appliances using a virtual private networking technology. Traffic management devices are used to monitor and/or control traffic passing through network devices to maintain a network's quality-of-service (QOS) level.

Traffic shaping is a technique for regulating traffic. Traffic shaping refers to a process of analyzing an allocated bandwidth utilized by various types of network traffic through a network appliance. Traffic shaping policies can be used to prioritize users in accordance with an IP address or other criteria to provide different levels of service to different users of a network appliance.

A leaky bucket is one example of a conventional technique used to control traffic flow. A splash is added to the bucket for each incoming byte received by the network appliance when the bucket is not full. The splash results in an increment in a counter associated with the bucket. The bucket leaks away at a constant rate (bytes are allowed to pass from the bucket through the network appliance). When the bucket is full (the counter is at a maximum value), bytes cannot pass through the network appliance (i.e., no additional bytes can be added to the bucket). As the bucket begins to empty in accordance with the leak rate, bytes once again can begin to be added to the bucket so that they can be moved through the network appliance. Leaky buckets are characterized by three parameters: the sustained information rate (SIR), the peak information rate (PIR) and the burst length (BL). The SIR is bound by the long-term data rate and defines the rate that data leaks from the bucket. BL defines the depth of the bucket and is equal to the maximum amount of data allowed to be passed when the bucket is empty. PIR defines the maximum rate at which the source can send data.

A token bucket is another example of a conventional technique used to control traffic flow. With token buckets, tokens are added to the bucket at a constant rate of the SIR. The token is a convention that is used to represent a defined unit of data (e.g., a byte or a packet). The token bucket has a depth of BL. When the token bucket is full no more tokens can be added to the bucket. When data comes in to the network appliance, if there are enough tokens in the token bucket, the data will be passed. Otherwise, the data will be held until the token bucket accumulates enough tokens.

A credit/debit token bucket is another example of a conventional technique used to control traffic flow. In the example discussed above for the token bucket, no data can be passed when there are insufficient tokens in the token bucket. This may cause some unacceptable delays. A credit/debit token bucket allows for oversubscription of tokens. Unlike normal token buckets, the number of tokens in a credit/debit token bucket can be negative. Based on the number of tokens in the bucket, a credit/debit token bucket can be in either one of the three states. If the number of tokens is positive the bucket has credit. If the number of tokens is negative the bucket owes a debit. Otherwise the bucket is in an even state. The operation of a conventional credit/debit token bucket is as follows. Tokens are added to a credit/debit token bucket in the same way as added to a normal token bucket. The difference between a normal token bucket and credit/debit token bucket is how incoming data is handled. In a credit/debit token bucket, as long as the data comes in and the credit/debit token bucket is in the credit or even state, the data is granted permission to pass and the number of tokens is decremented accordingly. After the decrementing operation (to remove the corresponding number of tokens from the bucket based on the amount of data that was passed), the number of tokens in the bucket can be negative, even, or still positive. If data comes in while the credit/debit token bucket is in a debit state, the data is held until the credit/debit bucket returns to the credit or even state (i.e., pays off all of its debt). Thereafter, the network appliance can pass the held data.

As described above a bucket has a definite depth. For example, a token bucket can accept a definite number of tokens before it becomes full. Traditionally, when the bucket became full, the excess (e.g., the excessive tokens) was discarded (i.e., to satisfy a guaranteed bandwidth requirement). If an unlimited or undefined depth bucket were used then the underlying policy may become oversubscribed. In order to ensure that oversubscription does not occur, traditionally these excessive tokens were discarded. What would be desirable is a system that would allow a bucket to share its excess while still providing a guaranteed bandwidth to an associated policy.

SUMMARY

In one aspect the invention provides a method for allocating bandwidth in a network appliance where the network appliance includes a plurality of guaranteed bandwidth buckets used to evaluate when to pass traffic through the network appliance. The method includes providing a shared bandwidth bucket associated with a plurality of the guaranteed bandwidth buckets, allocating bandwidth to the shared bandwidth bucket based on the underutilization of bandwidth in the plurality of guaranteed bandwidth buckets and sharing excess bandwidth developed from the underutilization of the guaranteed bandwidth allocated to the individual guaranteed bandwidth buckets. The step of sharing includes borrowing bandwidth from the shared bandwidth bucket by a respective guaranteed bandwidth bucket to allow traffic to pass immediately through the network appliance.

Aspects of the invention can include one or more of the following features. The shared bandwidth bucket can be a token bucket. The guaranteed bandwidth buckets can be token buckets or credit/debit buckets. Each guaranteed bandwidth bucket can be associated with a traffic shaping policy. A plurality of guaranteed bandwidth buckets can be associated with a single traffic shaping policy. The traffic shaping policy can screen based on IP address. The traffic shaping policy can screen based on the source IP address, the destination IP address, the protocol type, UPD/TCP port number, type of service requested and/or the traffic content.

In another aspect the invention provides a method for allocating bandwidth in a network appliance. The method includes defining a guaranteed bandwidth allocation for a first policy for passing traffic through the network appliance including using a first bucket to allocate the guaranteed bandwidth. A guaranteed bandwidth allocation for a second policy for passing traffic through the network appliance is also defined including using a second bucket to allocate the guaranteed bandwidth. Excess bandwidth developed from the underutilization of the guaranteed bandwidth allocated to the first and second buckets is shared. Sharing includes providing a shared bandwidth bucket associated with first and second buckets and borrowing bandwidth from the shared bandwidth bucket by one of the first and second buckets when the respective bucket has insufficient bandwidth to allow traffic to pass immediately through the network appliance.

In another aspect, the invention provides an apparatus for allocating bandwidth in a network appliance where the network appliance includes a plurality of guaranteed bandwidth buckets used to evaluate when to pass traffic through the network appliance. The apparatus includes a shared bandwidth bucket associated with a plurality of the guaranteed bandwidth buckets, means for allocating bandwidth to the shared bandwidth bucket based on the underutilization of bandwidth in the plurality of guaranteed bandwidth buckets and a scheduler. The scheduler is operable to evaluate a packet to determine if a traffic shaping policy should be applied to a given packet, evaluate a guaranteed bandwidth bucket associated with an identified traffic shaping policy, determine when the guaranteed bandwidth bucket associated with an identified traffic shaping policy has insufficient capacity to support a transfer of the packet through the network and borrow bandwidth from the shared bandwidth bucket by a respective guaranteed bandwidth bucket to allow traffic to pass immediately through the network appliance.

Aspects of the invention can include one or more of the following advantages. Cascaded buckets are provided that support a guaranteed bandwidth for a policy while also allowing for sharing of that guaranteed bandwidth among other policies in the event that the bandwidth is under utilized. The shared bandwidth supports the elimination of static bandwidth allocation while guaranteed bandwidth is not compromised. By allowing the network appliance to share the unused guaranteed bandwidth, the bandwidth utilization of the network appliance can be dramatically improved.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
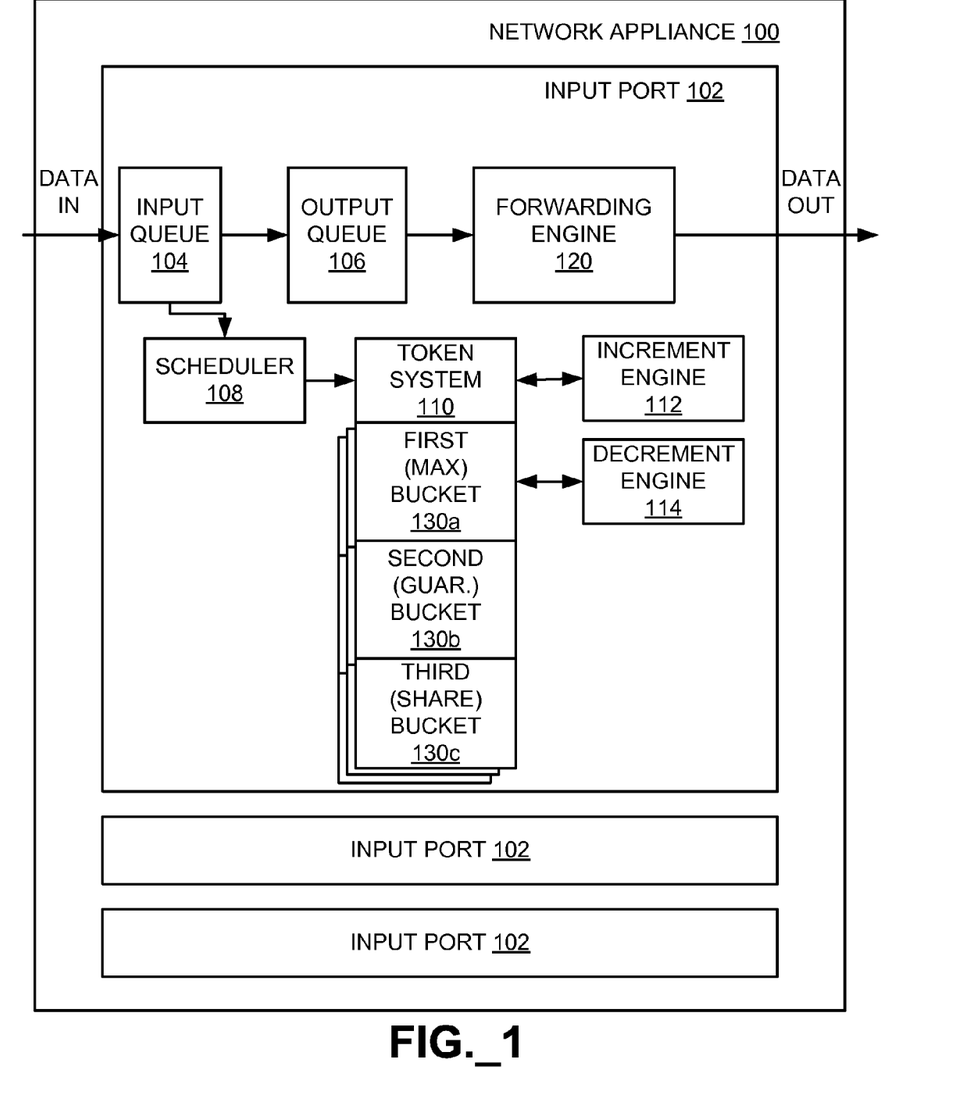
FIG. 1 is a shows a block diagram for a network appliance that includes cascaded buckets.

Referring now to FIG. 1, a network appliance 100 that includes traffic shaping policy tools is shown. Network appliance 100 includes a plurality of input ports 102 each of which includes an input queue 104, an output queue 106, a scheduler 108 and a forwarding engine 120. Associated with scheduler 108 are a token system 110, increment engine 112 and decrement engine 114.

As data is received at an input port 102, the data is transported into the input queue 104. Input queue 104 acts as a first in/first out buffer for holding packets that are received from the input port 102. Scheduler 108 periodically checks the status of token system 110 to determine whether or not a data packet stored in the input queue 104 can be passed to the output queue 106. When scheduler 108 determines that there are sufficient tokens in the token system 110, then a packet may be transferred from the input queue 104 to the output queue 106. Thereafter, packets can be passed in order from the output queue 108 to other portions of the network appliance by forwarding engine 120. At a predetermined rate, increment engine 112 adds tokens to the token system 110. Similarly, as packets are transferred from the input queue 104 to the output queue 106, decrement engine 114 removes the appropriate amount of tokens from the token system 110.

Token system 110 includes a plurality of traffic shaping policy buckets. As described above, a traffic shaping policy is a convention used to ensure levels of service to users of the network appliance. A policy is any user-defined criteria for grouping input received at the network appliance. The policy can be based on IP address or other constraints in order to manage the traffic from one particular user defined group. One or more policies can be evaluated for each packet. For example, one policy may screen based on an IP address for the packet sender. Another policy may screen based on a destination IP address. Other parameters other than IP address can be used in constructing a traffic shaping policy.

In one implementation, for each policy, token system 110 includes at least three buckets 130a, 130b and 130c. Each first bucket 130a, also referred to as a maximum bandwidth allocation bucket, is configured as a conventional token bucket that has a SIR that is equal to the maximum rate at which data of the policy type can be sent. Tokens are added to the first bucket 130a at a rate to limit the bandwidth allocated for the given policy to the maximum bandwidth allocation assigned to the given policy. If the balance (in tokens) in the maximum bandwidth bucket 130a is greater than or equal to zero, then the scheduler 108 will allow the packet to pass from the input queue 104 to the output queue 106 (assuming that the balances in the second and third buckets are appropriate). However, if the balance in the maximum bandwidth bucket 130a is less than zero, then no packets of this type (that include the policy parameter) will pass from the input queue 104 to the output queue 106 at this time. This guarantees that the particular policy cannot be oversubscribed.

Second bucket 130b is a guaranteed bandwidth bucket. The guaranteed bandwidth bucket 130b operates in a similar fashion to the maximum bandwidth bucket 130a and includes an SIR set to be the guaranteed bandwidth allocation for the policy. When a packet is received (assuming that the maximum bandwidth allocation bucket has a balance that is greater than or equal to 0), then the balance of the guaranteed bandwidth bucket 130b is checked to determine if the packet's size is greater than or less than the balance in the guaranteed bandwidth bucket 130*b*. If the balance of tokens is greater than the packet's size, then scheduler 108 allows the packet to be transferred from the input queue 104 to the output queue 106. If the balance is less than the packet's size, then an attempt is made to borrow from the third bucket 130*c*.

The third bucket is referred to as the shared bandwidth bucket 130*c*. The shared bandwidth bucket 130*c* has tokens added every time one or more of the guaranteed bandwidth buckets reaches its peak allocation. At a next time one or more tokens are scheduled to be added to an otherwise full guaranteed bandwidth bucket 130*b* (tokens which would otherwise be discarded), the token(s) are stored in the shared bandwidth bucket 130*c*. In one implementation, the shared bandwidth bucket 130*c* is shared among plural members (guaranteed bandwidth buckets 130*b*) of the same traffic shaping policy group. Traffic shaping policies can be grouped together by many different criteria such as physical interface and priority. Policies can also be grouped in a hierarchical way such that there are subgroups in a group. In operation, if the balance of a guaranteed bandwidth bucket 130*b* for any member of a policy group is less than the packet size, an attempt is made to borrow from the shared bandwidth bucket 130*c*. If the borrowing attempt fails, that is, if there are insufficient tokens in the shared bandwidth bucket 130*c*, then the packet will not be transferred to the output queue 106. Alternatively, if there are sufficient tokens in the shared bandwidth bucket 130*c* to allow for a borrowing operation, then a sufficient number of credits are transferred to the guaranteed bandwidth bucket that attempted the borrowing. Thereafter, the scheduler enables the transfer of the packet from the input queue 104 to the output queue 106. After the transfer, the decrement engine 114 removes the appropriate number of tokens from the shared bandwidth bucket 130*c* (i.e., the number borrowed) and from the appropriate guaranteed bandwidth bucket 130*b* (i.e., the number of tokens required to pass the packet).

Figure 2:
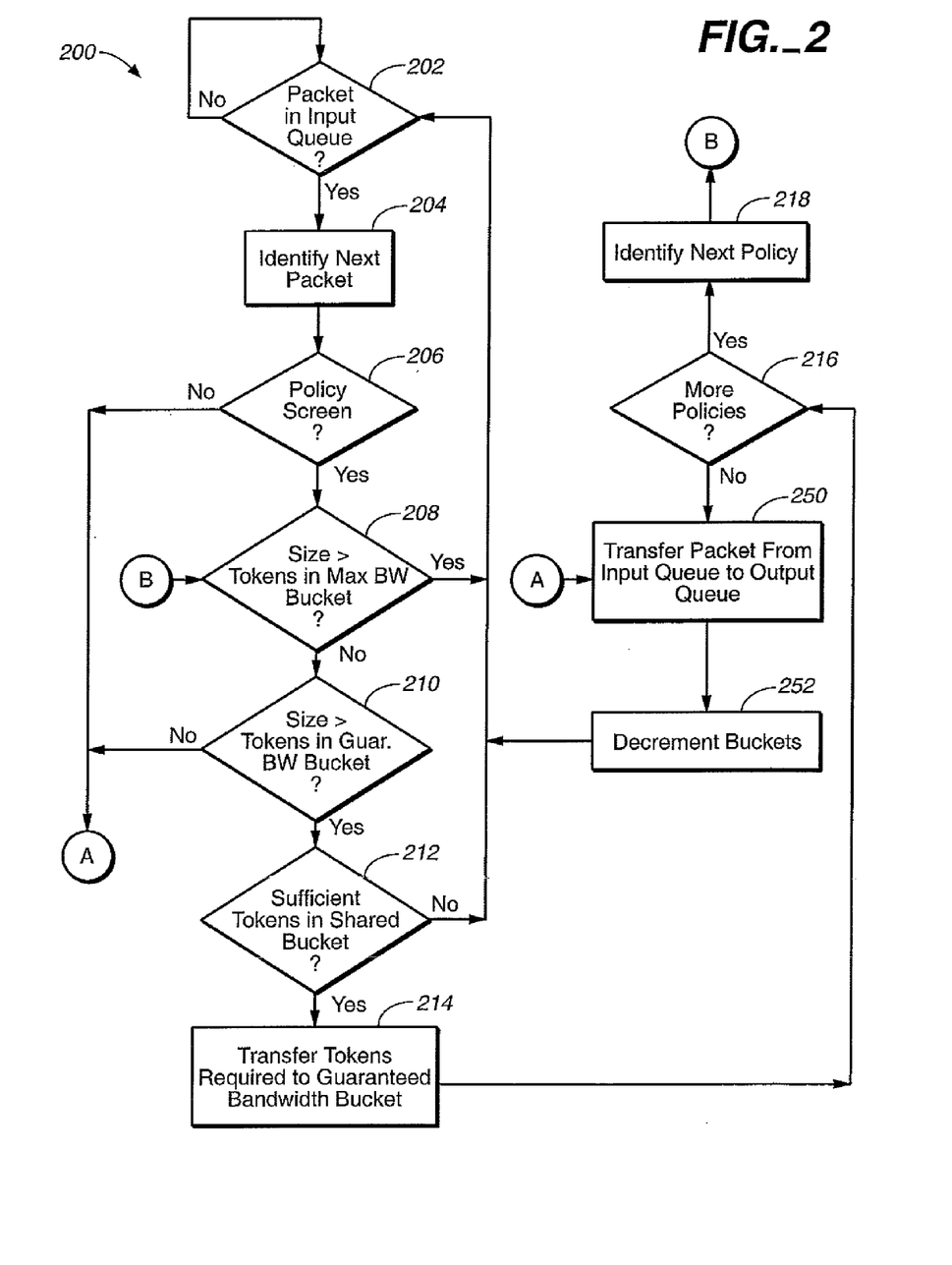
FIG. 2 is a flow diagram of a process for passing data through the network appliance of FIG. 1.

Referring now to FIG. 2, a process used by the scheduler 108 for determining when to transfer packets from the input queue 104 to the output queue 106 is shown. The process begins as the scheduler checks to determine if any packets are stored in the input queue (202). If not, the process waits for a packet to arrive and continues at step 202. Otherwise, a next packet in the input queue is identified (204). A check is made to determine if a policy screen should be applied to the packet (206). As described above, a policy screen includes one or more policy parameters. The policy parameters define the screening parameters for the policy. An example of a policy parameter is the packet's IP address. Packets can be screened based on destination, source or both. In addition, traffic can be screened based upon protocol type, UPD/TCP port number, type of service and traffic content such as websites. If no policy screen is to be applied, then the process continues at step 250 where the packet is transferred from the input queue 104 to the output queue 106.

If a policy is to be enforced, a check is made to determine if the size of the packet exceeds the balance of the maximum bandwidth bucket 130*a* associated with the identified policy (208). If the size exceeds the balance, then the process continues at step 202 without transferring the packet from the input queue 104 to the output queue 106. If the size does not exceed the balance in step 208, the scheduler checks to determine if the size of the packet exceeds the balance of the guaranteed bandwidth bucket 130*b* for the policy (210). If the size does not exceed the balance in step 210, then the process continues at step 250 where the packet is transferred from the input queue 104 to the output queue 106.

If the size exceeds the balance in step 210, then the scheduler determines if there are sufficient tokens in the shared bandwidth bucket 130*c* associated with the policy to pass the packet (212). If there are insufficient tokens in the shared bandwidth bucket 130*c*, the process continues at step 202 without transferring the packet from the input queue 104 to the output queue 106. If there are sufficient tokens in the shared bandwidth bucket 130*c*, then the appropriate amount of tokens is transferred (so that the balance in the guaranteed bandwidth bucket 130*b* equals or exceeds the size of the packet) from the shared bandwidth bucket 130*c* to the requesting guaranteed bandwidth bucket 130*b* (214). In one implementation, the tokens are physically transferred from the shared bandwidth bucket to the guaranteed bandwidth bucket during a borrowing operation. Alternatively, the tokens can be virtually passed, that is, allocated to the guaranteed bandwidth bucket without requiring them to be physically transferred. A check is made to determine if the packet needs to be screened against any other policies (216), if so, the next policy is identified (218) and the process continues at step 208.

In step 250, the scheduler 108 allows the transfer of the packet from the input queue 104 to the output queue 106. At the time of transfer, the appropriate number of tokens is decremented from the guaranteed bandwidth bucket and maximum bandwidth bucket for each policy used to screen the packet (252). Thereafter the process continues at step 202.

Figure 3:
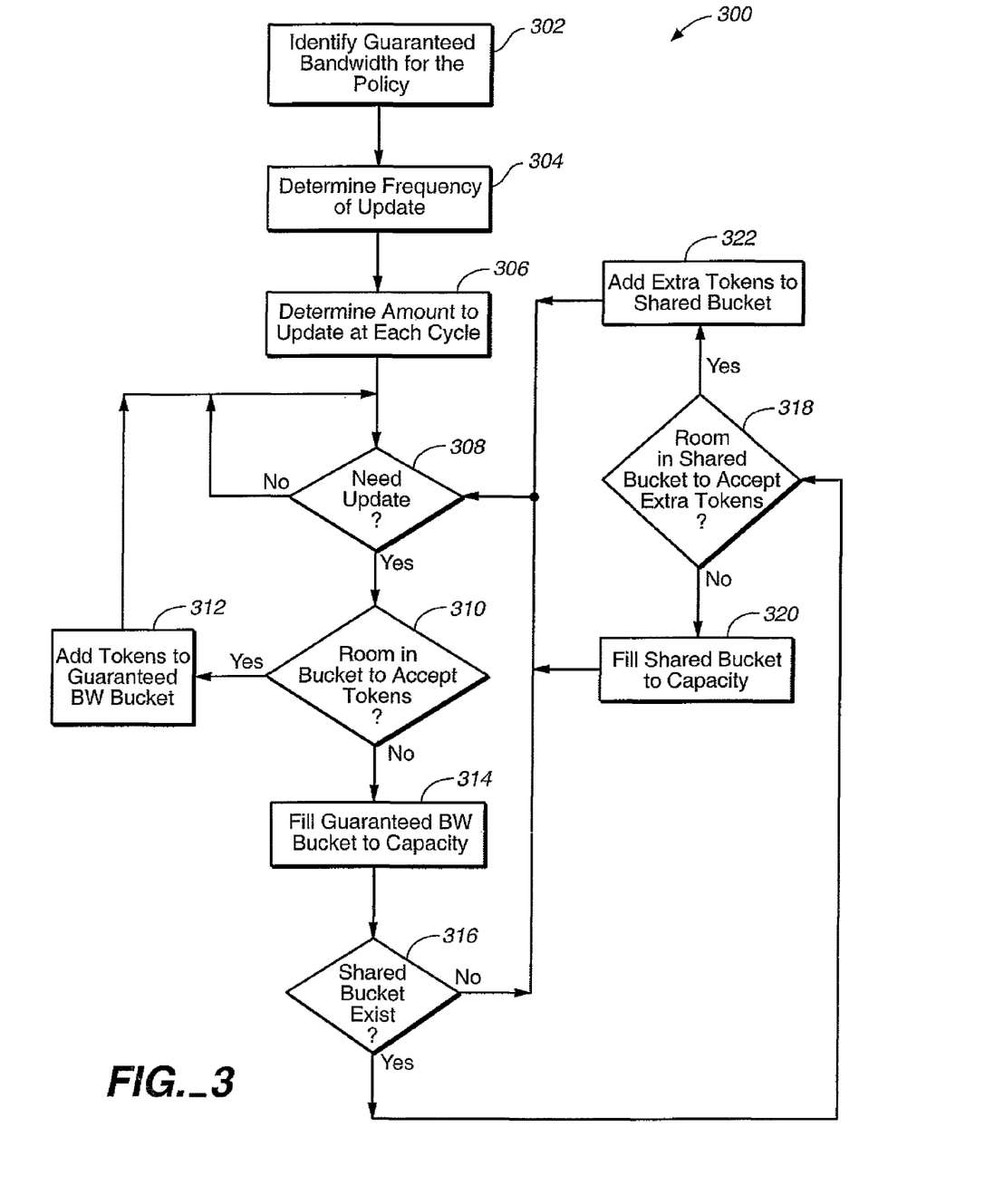
FIG. 3 is a flow diagram of a method for incrementing a guaranteed bandwidth bucket.

Referring now to FIG. 3, a flow diagram for a method for incrementing the guaranteed bandwidth buckets 130*b* is shown. The process begins by identifying a guaranteed bandwidth for the policy associated with the given guaranteed bandwidth bucket (302). A frequency for incrementing (304) and an amount of tokens to be added at each increment step are identified (306). A check is then made to determine if the guaranteed bandwidth bucket should be updated (based on the frequency data) (308). If not, the process continues at step 308 waiting for the next update period. If an update is warranted, then a check is made to determine if there is sufficient space in the guaranteed bandwidth bucket to accept the amount of tokens to be added (310). If there is enough space, then the tokens are added to the guaranteed bandwidth bucket (312) and the process continues at step 308.

If the check at step 310 fails, then the guaranteed bandwidth bucket is filled to its capacity (314). Thereafter, a check is made to determine if the guaranteed bandwidth bucket has an associated shared bandwidth bucket (316). If not, the process continues at step 308. If the guaranteed bandwidth bucket has an associated shared bandwidth bucket then a check is made to determine there is sufficient space in the shared bandwidth bucket to accept the amount of excess tokens (318). If there is not enough space, then the shared bandwidth bucket is filled to its capacity (320) and the process continues at step 308. If there is enough space, then all of the excess tokens are added to the shared bandwidth bucket (322) and the process continues at step 308.

Credit/Debit Guaranteed Bandwidth Bucket

In one implementation, the guaranteed bandwidth bucket 130*b* can be a credit/debit bucket. In this implementation, the maximum bandwidth bucket 130*a* is a conventional token bucket (i.e., no-debt bucket). The guaranteed bandwidth bucket 130*b* is a credit/debit bucket that is allowed to operate in a debt mode. The shared bandwidth bucket 130*c* is a conventional token (i.e., no-debt) bucket that includes the borrowing provisions set forth above.

In operation, the maximum bandwidth bucket 130*a* operates (is incremented and decremented) as described above to ensure the policy is not oversubscribed. Assuming that the number of tokens in the maximum bandwidth bucket is greater than or equal to zero, then the scheduler checks the guaranteed bandwidth bucket (the credit/debit version) to determine if the number of tokens is greater than the packet size. If so, then the packet is passed in the system and the appropriate number of tokens is debited from both the maximum bandwidth bucket and the guaranteed bandwidth bucket. If the number of tokens in the guaranteed bandwidth bucket 130*b* is greater than 0 however, less than the packet size then the packet passes, but there is no borrowing operation that occurs. The packet passes in accordance with the standard credit/debit protocol associated with a credit/debit bucket. If however the number of tokens in the guaranteed bandwidth bucket 130*b* is less than 0, the scheduler attempts to borrow (from an associated shared bandwidth bucket 130*c*, if any).

In one implementation, the scheduler may borrow only to cover the debt (incurred for passing the packet). Alternatively, in another implementation, the scheduler may borrow to cover the packet size itself. In a third implementation, the scheduler may borrow to cover both the debt as well as the packet size.

Two-Bucket System

In one implementation, token system 110 includes only cascaded pairs of buckets. In this implementation, token system 110 includes a plurality of guaranteed bandwidth buckets 130*b*, one or more for each policy that is supported, and one or more shared bandwidth buckets (to allow sharing among policies or in a policy). Each of the guaranteed bandwidth buckets operates as described above. The guaranteed bandwidth buckets can either be conventional token buckets, leaky buckets, or credit/debit buckets. When a guaranteed bandwidth bucket does not have sufficient tokens/space to allow a packet to pass, the scheduler can attempt to borrow from a shared bandwidth bucket associated with a given policy (or policies).

The shared bandwidth bucket can support plural different policies. The network appliance can provide a dynamic allocation of resources that supports both guaranteed bandwidth among policies and also a sharing of guaranteed bandwidth among members of one or more policies.

Priority Information

In an alternative implementation, when a guaranteed bandwidth bucket attempts to borrow from a shared bandwidth bucket, the scheduler considers priority data when determining whether borrowing is allowed. Each guaranteed bandwidth bucket can be assigned a priority. The priority data can be used to determine when borrowing is allowed. The priority data can be set based on use of the shared bandwidth bucket. Depending on the priority level setting for a given guaranteed bandwidth bucket, the borrowing operation may be disallowed. The priority level can be used to determine how a policy/policies will share the bandwidth in the shared bucket that is available. The higher priority policy can be allocated the shared bandwidth before a lower priority policy.

The present invention can be used by any traffic shaper to enforce traffic shaping policies. The traffic shaper can be a dedicated device such as a package shaper or a multi-function device with traffic shaping functionality such as a router or a firewall engine. The present invention allows a traffic shaper to dynamically allocate guaranteed bandwidth for a policy. System administrators can avoid the limitations of static allocations while guaranteed bandwidth is not compromised A number of embodiments of the invention have been described. Nevertheless, it will be understood that various modifications may be made without departing from the spirit and scope of the invention. Accordingly, other embodiments are within the scope of the following claims.

What is claimed is:

1. A method comprising:
    applying, by a network device, a first policy to data to be transferred through the network device;
    transferring, by the network device, bandwidth from a shared bandwidth bucket to a first guaranteed bandwidth bucket, associated with the first policy, when bandwidth in the first guaranteed bandwidth bucket is not sufficient to allow the data to be transferred through the network device,
        bandwidth being allocated to the shared bandwidth bucket based on an underutilization of bandwidth in the first guaranteed bandwidth bucket and an underutilization of bandwidth in a second guaranteed bandwidth bucket that is associated with a second policy,
        the second policy being different from the first policy;
    determining, by the network device, whether the second policy is to be applied to the data after transferring the bandwidth to the first guaranteed bandwidth bucket;
    transferring, by the network device, the data through the network device without applying the second policy when the second policy is not to be applied; and
    when the second policy is to be applied to the data:
        applying, by the network device, the second policy to the data,
        transferring, by the network device, bandwidth from the shared bandwidth bucket to the second guaranteed bandwidth bucket when bandwidth, in the second guaranteed bandwidth bucket, is not sufficient to allow the data to be transferred through the network device, and
        transferring, by the network device, the data through the network device after applying the second policy.

2. The method of claim 1, where applying the first policy includes:
    screening the data based on an Internet protocol (IP) address associated with the data, and
    where applying the second policy includes:
    screening the data based on a protocol type associated with the data.

3. The method of claim 1, further comprising:
    identifying, based on applying the first policy, a priority associated with the first guaranteed bandwidth bucket, and
    where transferring the bandwidth from the shared bandwidth bucket to the first guaranteed bandwidth bucket includes:
        transferring the bandwidth from the shared bandwidth bucket to the first guaranteed bandwidth bucket based on the identified priority.

4. The method of claim 1, where the first guaranteed bandwidth bucket and the second guaranteed bandwidth bucket comprise token buckets, and
    where transferring the bandwidth from the shared bandwidth bucket to the first guaranteed bandwidth bucket or transferring the bandwidth from the shared bandwidth bucket to the second guaranteed bandwidth bucket includes:
        transferring tokens from the shared bandwidth bucket to the first guaranteed bandwidth bucket or to the second guaranteed bandwidth bucket.

5. The method of claim 1, where the first guaranteed bandwidth bucket and the second guaranteed bandwidth bucket comprise token buckets, and
    where transferring the bandwidth from the shared bandwidth bucket to the first guaranteed bandwidth bucket or transferring the bandwidth from the shared bandwidth bucket to the second guaranteed bandwidth bucket includes:
virtually transferring tokens from the shared bandwidth bucket to the first guaranteed bandwidth bucket or to the second guaranteed bandwidth bucket.

6. The method of claim 1, where transferring the data without applying the second policy includes:
transferring the data from an input queue of the network device to an output queue of the network device.

7. The method of claim 1, where the first guaranteed bandwidth bucket and the second guaranteed bandwidth bucket comprise credit/debit buckets.

8. A device comprising:
one or more elements to:
allocate bandwidth to a shared bandwidth bucket based on an underutilization of bandwidth in a first guaranteed bandwidth bucket, associated with a first policy, and an underutilization of bandwidth in a second guaranteed bandwidth bucket, that is associated with a second policy,
the second policy being different from the first policy,
apply the first policy to data to be transferred through the device,
transfer, based on applying the first policy, bandwidth from the shared bandwidth bucket to the first guaranteed bandwidth bucket, associated with the first policy, when bandwidth in the first guaranteed bandwidth bucket is not sufficient to allow the data to be transferred through the device,
determine whether the second policy is to be applied to the data after transferring the bandwidth to the first guaranteed bandwidth bucket,
transfer the data through the device without applying the second policy when the second policy is not to be applied, and
when the second policy is to be applied to the data:
apply the second policy to the data,
transfer, based on applying the second policy, bandwidth from the shared bandwidth bucket to the second guaranteed bandwidth bucket when bandwidth, in the second guaranteed bandwidth bucket, is not sufficient to allow the data to be transferred through the device, and
transfer the data through the device based on applying the second policy.

9. The device of claim 8, where the one or more elements are further to:
determine a frequency associated with the first guaranteed bandwidth bucket or the second guaranteed bandwidth bucket, and
where, when allocating the bandwidth to the shared bandwidth bucket, the one or more elements are to:
allocate the bandwidth to the shared bandwidth bucket based on the determined frequency.

10. The device of claim 8, where, when applying the first policy, the one or more elements are to:
screen the data based on at least one of:
an Internet protocol (IP) address associated with the data,
a protocol type associated with the data,
a type of service associated with the data, or
a port associated with the data.

11. The device of claim 8, where the one or more elements are further to:
determine, based on applying the first policy, a priority associated with the first guaranteed bandwidth bucket, and
where, when transferring the bandwidth from the shared bandwidth bucket to the first guaranteed bandwidth bucket, the one or more elements are to:
transfer the bandwidth from the shared bandwidth bucket to the first guaranteed bandwidth bucket based on the determined priority.

12. The device of claim 8, where the first guaranteed bandwidth bucket and the second guaranteed bandwidth bucket comprise token buckets, and
where, when transferring the bandwidth from the shared bandwidth bucket to the first guaranteed bandwidth bucket or transferring the bandwidth from the shared bandwidth bucket to the second guaranteed bandwidth bucket, the one or more elements are to:
perform a borrowing operation to transfer tokens from the shared bandwidth bucket to the first guaranteed bandwidth bucket or to the second guaranteed bandwidth bucket.

13. The device of claim 8, where the first guaranteed bandwidth bucket and the second guaranteed bandwidth bucket comprise token buckets, and
where, when transferring the bandwidth from the shared bandwidth bucket to the first guaranteed bandwidth bucket or transferring the bandwidth from the shared bandwidth bucket to the second guaranteed bandwidth bucket, the one or more elements are to:
virtually transfer tokens from the shared bandwidth bucket to the first guaranteed bandwidth bucket or to the second guaranteed bandwidth bucket.

14. The device of claim 8, where, when transferring the data through the device without applying the second policy, the one or more elements are further to:
transfer the data from an input queue of the device to an output queue of the device.

15. A system comprising:
a device to:
identify a first policy to be applied to data stored in an input queue of the device;
apply the first policy to the data;
transfer bandwidth from a shared bandwidth bucket to a first guaranteed bandwidth bucket, associated with the first policy, when bandwidth in the first guaranteed bandwidth bucket is not sufficient to allow the data to be transferred through the device,
bandwidth being allocated to the shared bandwidth bucket based on an underutilization of bandwidth in the first guaranteed bandwidth bucket and an underutilization of bandwidth in a second guaranteed bandwidth bucket that is associated with a second policy,
the second policy being different from the first policy;
determine whether the second policy is to be applied to the data after transferring the bandwidth from the shared bandwidth bucket to the first guaranteed bandwidth bucket;
transfer the data the input queue to an output queue of the device without applying the second policy when the second policy is not to be applied to the data and
when the second policy is to be applied to the data:
apply the second policy to the data;
transfer bandwidth from the shared bandwidth bucket to the second guaranteed bandwidth bucket when bandwidth, in the second guaranteed bandwidth bucket is not sufficient to allow the data to be transferred through the device; and transfer, based on transferring the bandwidth from the shared bandwidth bucket to the second guaranteed bandwidth bucket, the data from the input queue to the output queue of the device.

16. The system of claim 15, where the device is further to:
determine a frequency associated with the first guaranteed bandwidth bucket or the second guaranteed bandwidth bucket, and where, when allocating the bandwidth to the shared bandwidth bucket, the device is to:
allocate the bandwidth to the shared bandwidth bucket based on the determined frequency.

17. The system of claim 15, where, when applying the first policy, the device is to:
screen the data based on at least one of:
an Internet protocol (IP) address associated with the data,
a protocol type associated with the data,
a type of service associated with the data, or
a port associated with the data.

18. The system of claim 15, where the device is further to:
determine, based on applying the first policy, a priority associated with the first guaranteed bandwidth bucket, and where, when transferring the bandwidth from the shared bandwidth bucket to the first guaranteed bandwidth bucket, the device is to:
transfer the bandwidth, from the shared bandwidth bucket is transferred to the first guaranteed bandwidth bucket based on the determined priority.

19. The system of claim 15, where the first guaranteed bandwidth bucket and the second guaranteed bandwidth bucket comprise token buckets, and where, when transferring the bandwidth from the shared bandwidth bucket to the first guaranteed bandwidth bucket or transferring the bandwidth from the shared bandwidth bucket to the second guaranteed bandwidth bucket, the device is to:
perform a borrowing operation to transfer tokens from the shared bandwidth bucket to the first guaranteed bandwidth bucket or to the second guaranteed bandwidth bucket.

20. The system of claim 15, where the first guaranteed bandwidth bucket and the second guaranteed bandwidth bucket comprise token buckets, and where, when transferring the bandwidth from the shared bandwidth bucket to the first guaranteed bandwidth bucket or transferring the bandwidth from the shared bandwidth bucket to the second guaranteed bandwidth bucket, the device is to:
virtually transfer tokens from the shared bandwidth bucket to the first guaranteed bandwidth bucket or to the second guaranteed bandwidth bucket.

* * * * *

UNITED STATES PATENT AND TRADEMARK OFFICE
CERTIFICATE OF CORRECTION

PATENT NO. : 8,614,951 B2
APPLICATION NO. : 13/222568
DATED : December 24, 2013
INVENTOR(S) : Changming Liu et al.

Page 1 of 1

It is certified that error appears in the above-identified patent and that said Letters Patent is hereby corrected as shown below:

In the Claims:

Correct claim 15 as follows:

Column 11, line 1, after "bucket" insert --,--.

Correct claim 18 as follows:

Column 12, line 3, after "bucket" insert --,--.

Signed and Sealed this
Fifteenth Day of July, 2014

Michelle K. Lee
*Deputy Director of the United States Patent and Trademark Office*